(12) United States Patent
Super et al.

(10) Patent No.: US 10,131,217 B2
(45) Date of Patent: Nov. 20, 2018

(54) VEHICLE WHEEL WELL COVERING

(71) Applicant: IP File Worldwide Ltd., Tortola (VG)

(72) Inventors: Neal Super, Mamaroneck, NY (US); Merry Riehm-Constantino, Buffalo, NY (US); Lyndon Treacy, Brooklyn, NY (US); Amy B. Hangen, Clarence, NY (US)

(73) Assignee: IP FILE WORLDWIDE LTD. (VG)

( * ) Notice: Subject to any disclaimer, the term of this patent is extended or adjusted under 35 U.S.C. 154(b) by 0 days.

(21) Appl. No.: 15/323,196

(22) PCT Filed: Jun. 30, 2015

(86) PCT No.: PCT/IB2015/001674
§ 371 (c)(1),
(2) Date: Dec. 30, 2016

(87) PCT Pub. No.: WO2016/001758
PCT Pub. Date: Jan. 7, 2016

(65) Prior Publication Data
US 2017/0144526 A1    May 25, 2017

Related U.S. Application Data

(60) Provisional application No. 62/112,371, filed on Feb. 5, 2015, provisional application No. 62/108,182, filed
(Continued)

(51) Int. Cl.
*B62D 25/18*      (2006.01)
*B60J 11/10*      (2006.01)

(52) U.S. Cl.
CPC ............................ *B60J 11/10* (2013.01)

(58) Field of Classification Search
CPC .. B60J 11/10; B60J 11/00; B60J 11/06; B60R 19/00; B60R 19/54; B62D 25/16;
(Continued)

(56) References Cited

U.S. PATENT DOCUMENTS

| | | | | |
|---|---|---|---|---|
| 1,392,166 A | * | 9/1921 | Immer | ............... B60R 19/54 37/263 |
| 2,605,119 A | * | 7/1952 | Earnest | ............... B62D 25/168 280/160 |

(Continued)

FOREIGN PATENT DOCUMENTS

| | | |
|---|---|---|
| FR | 377620 A | 9/1907 |
| KR | 200167799 | 2/2000 |

(Continued)

OTHER PUBLICATIONS

International Search Report for PCT/IB2015/001674 dated Jan. 28, 2016.
(Continued)

*Primary Examiner* — James M Dolak
(74) *Attorney, Agent, or Firm* — Kim Winston LLP

(57) ABSTRACT

A vehicle wheel well covering for protecting a wheel well area of a vehicle. The vehicle wheel well covering includes a cover for covering a vehicle wheel well, a shovel assembly extending from the cover, a spine assembly supporting the cover, and a retention prong extending from the spine assembly. The shovel assembly is coupled to the spine assembly and includes a shoveling member and a handle coupled to the shoveling member.

9 Claims, 13 Drawing Sheets

Related U.S. Application Data on Jan. 27, 2015, provisional application No. 62/018,786, filed on Jun. 30, 2014.

(58) Field of Classification Search
CPC .... B62D 25/18; B62D 25/182; B62D 25/165; B62D 25/163; B62D 25/186; B60S 1/62; B60S 1/66; B60S 1/68; B60S 1/00; B60S 3/00; B60S 3/04; B60S 3/042; B60B 15/00; B60B 15/02; B60B 15/26; B60B 15/263; B60B 7/00; B60B 7/04; B60B 7/06; B60B 7/061; B60B 7/08; B60B 7/10; B60B 7/12

See application file for complete search history.

(56) References Cited

U.S. PATENT DOCUMENTS

| | | | | |
|---|---|---|---|---|
| 2,623,310 | A * | 12/1952 | Raught | A01B 39/06 |
| | | | | 172/439 |
| 2,849,045 | A | 8/1958 | Anderson | |
| 2,934,124 | A * | 4/1960 | Mihlsten | B60C 23/18 |
| | | | | 152/153 |
| 2,955,368 | A * | 10/1960 | Winsett | B60R 19/54 |
| | | | | 15/54 |
| 4,665,636 | A * | 5/1987 | Borras | E01H 5/06 |
| | | | | 37/234 |
| 5,573,686 | A * | 11/1996 | Lavicska | B62D 25/161 |
| | | | | 219/202 |
| 5,836,399 | A * | 11/1998 | Maiwald | B62D 25/186 |
| | | | | 172/509 |
| 5,842,733 | A | 12/1998 | Miller | |
| 7,093,908 | B2 * | 8/2006 | Garrett | B60J 11/10 |
| | | | | 301/37.103 |
| 7,651,108 | B2 * | 1/2010 | Bonnaud | B60B 7/04 |
| | | | | 280/156 |
| 8,251,458 | B2 * | 8/2012 | Biesse | B60B 19/04 |
| | | | | 301/39.1 |
| 9,598,116 | B2 * | 3/2017 | Riddick | B62D 25/182 |
| 9,719,224 | B2 * | 8/2017 | Borges | E01H 5/061 |
| 9,994,198 | B1 * | 6/2018 | Emanuelli | B60S 3/042 |
| 2005/0264092 | A1 | 12/2005 | Garrett | |
| 2007/0278846 | A1 * | 12/2007 | Fleming | B60B 7/00 |
| | | | | 301/37.104 |
| 2011/0099857 | A1 | 5/2011 | Thomas | |
| 2011/0304129 | A1 | 12/2011 | Owens | |
| 2013/0096781 | A1 * | 4/2013 | Reichenbach | B60Q 1/326 |
| | | | | 701/49 |
| 2013/0283647 | A1 | 10/2013 | Borges et al. | |

FOREIGN PATENT DOCUMENTS

| | | |
|---|---|---|
| KR | 1020140007177 | 1/2014 |
| RU | 2381128 C1 | 2/2010 |

OTHER PUBLICATIONS

Written Opinion of the International Searching Authority for PCT/IB2015/001674 dated Jan. 28, 2016.
Russian Office Action dated Apr. 10, 2018 in Patent Application No. 2017102761.
European Office Action dated Mar. 16, 2018 in Patent Application No. 15814105.1.
Korean Office Action dated Jul. 19, 2018 in Patent Application No. 10-2017-7002350.

* cited by examiner

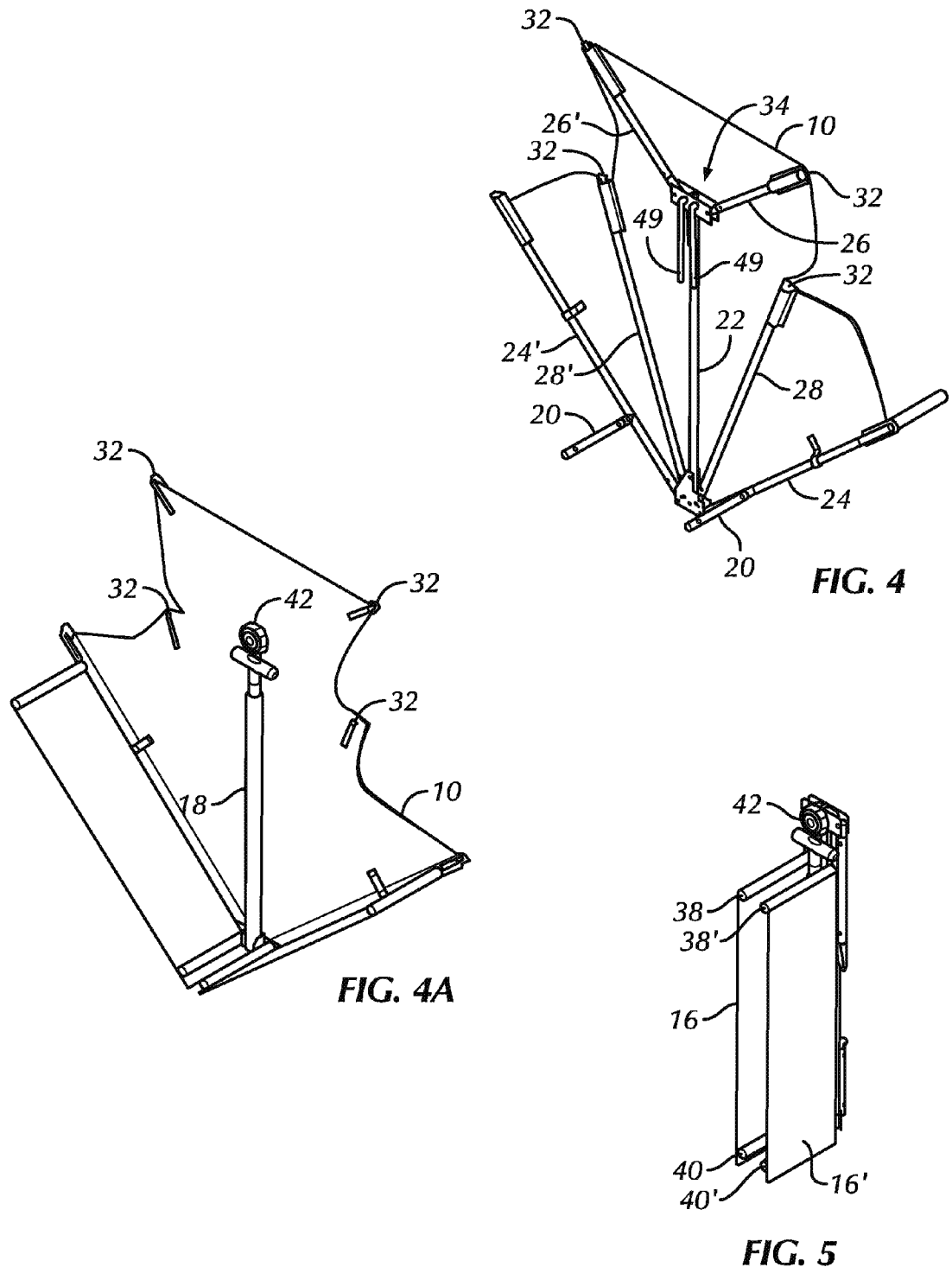

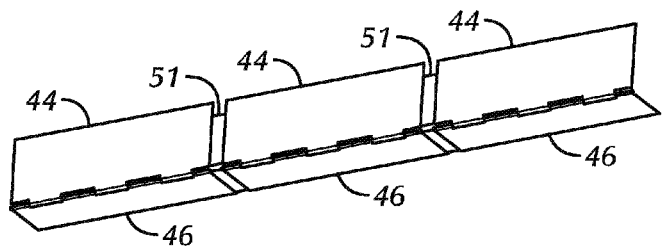
FIG. 8A
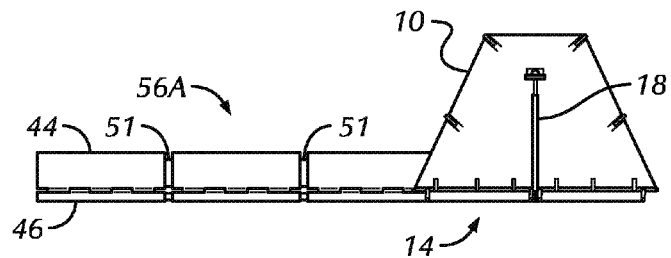
FIG. 8
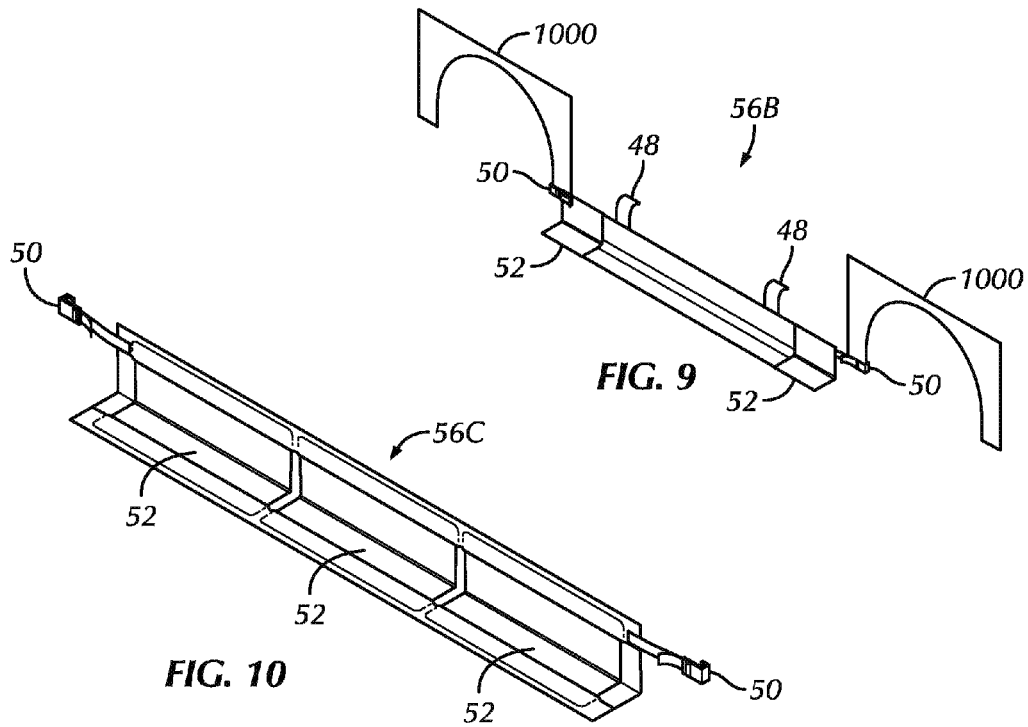
FIG. 9
FIG. 10

VEHICLE WHEEL WELL COVERING

CROSS-REFERENCE TO RELATED APPLICATIONS

This application is a U.S. national phase application under 35 U.S.C. § 371 of International Application No. PCT/IB2015/001674 filed on Jun. 30, 2015, which itself is related to and claims the benefit of U.S. Provisional Patent Application No. 62/018,786 filed Jun. 30, 2014, U.S. Provisional Patent Application No. 62/108,182 filed Jan. 27, 2015, and U.S. Provisional Patent Application No. 62/112,371 filed Feb. 5, 2015, the entire disclosures of which are hereby incorporated by reference in their entirety.

BACKGROUND OF THE INVENTION

The present invention generally relates to a vehicle wheel well covering for automotive vehicles. In particular, the present invention relates to a vehicle wheel well covering for protecting the wheel well area of a vehicle that includes a shovel mechanism for easily removing e.g., snow and wintry elements from the wheel well area of the vehicle.

Typically during the winter months there can be an accumulation of snow and ice in and around the wheel and wheel well arch area. This accumulation of snow and ice can further extend into the undercarriage of the vehicle. Such accumulation of snow and ice is further exacerbated during moderate to severe snow storms and drifting snow from wind and snow plows operating on the road. Additionally, shoveling around vehicles can lead to damage to the body of the car in the form of shovel scrapes and dents. Furthermore, shoveling can often require difficult physical exertion in cold, uncomfortable conditions.

It is imperative for individuals to efficiently remove snow and ice from the front of the vehicle and its surrounding area in order to allow for operation of the vehicle. As such, a need exists for a vehicle wheel well covering that prevents snow, ice and/or other debris from accumulating around the wheel well area of the vehicle, protects the body of the car from damage from shoveling, and facilitates the efficient and easier removal of snow, ice and/or debris. Such a need is satisfied by the vehicle wheel well covering of the present invention.

BRIEF SUMMARY OF THE INVENTION

In accordance with a preferred embodiment, the present invention provides a vehicle wheel well covering comprising a cover for covering a vehicle wheel well and a shovel assembly e.g., a shoveling blade, extending from the cover. The cover extends upwardly from the shoveling blade. The shoveling blade attaches to the cover about a bottom end and supports the cover. In addition, the shoveling blade extends across an entire width of the cover. The cover is sized and shaped sufficiently to substantially cover the vehicle wheel well.

In accordance with another preferred embodiment, the present invention provides a vehicle wheel well covering comprising a cover, a spine assembly supporting the cover, and a shovel assembly coupled to the spine assembly. The cover includes a fastener for releasably securing the handle to the cover. The shovel assembly includes a shoveling member and a handle coupled to the shoveling member. The shoveling member is connected to a first extension member. The vehicle wheel well covering further includes a retention prong extending from the spine assembly. The spine assembly includes a central support member having the first extension member pivotably connected to a first end of the central support member and a second extension member pivotably connected to a second end of the central support member opposite the first end. The second extension member has a first end pivotably connected to the central support member and a second end connected to an outer edge of the cover. The first extension member and the second extension member pivot between an open position for expanding the cover and a closed position for collapsing the cover. The handle is pivotably connected to the first end of the central support member. The vehicle wheel well covering further includes a locking member extending from the central support member for securing the vehicle wheel well covering to the vehicle. The vehicle wheel well covering further includes an extension cover member releasably connected to the spine assembly.

In accordance with yet another preferred embodiment, the present invention provides a foldable vehicle wheel well covering comprising a cover panel for covering a vehicle wheel well, a base panel extending from the cover panel and foldably connected to a bottom end of the cover panel about a first direction for forming a supporting base and supporting the cover panel. The foldable vehicle wheel well covering also includes a first lateral panel foldably connected to the cover panel about a first lateral side of the cover panel and a second lateral panel foldably connected to the cover panel about a second lateral side of the cover panel.

The first and second lateral panels are each foldable about a pair of substantially vertically oriented and spaced apart folding lines for forming bent first and second lateral panels. In addition, the base panel includes an additional folding line to fold the base panel in a second direction substantially opposite the first direction for forming a folded flap about a bottom end of the cover panel. The folded flap extends anteriorly from the cover panel and the base panel extends posteriorly from the cover panel. The foldable vehicle wheel well covering further includes a fastener for releasably holding the first and second lateral panels in their respective folded positions.

In accordance with another preferred embodiment, the present invention provides a vehicle wheel well covering comprising a base that includes a retention member for abutting a wheel of a vehicle and a shovel assembly e.g., a shovel member. The vehicle wheel well covering further includes a cover mounted to and extending upwardly from the base for covering a wheel well of the vehicle. The cover includes an anterior side and a posterior side, and the shovel assembly e.g., shovel member, extends outwardly from the anterior side while the retention member extends outwardly from the posterior side. The shovel assembly extends across an entire width of the base.

The base includes a pair of spaced apart retention members and optional retractable wheels. The vehicle wheel well covering further includes a male lateral extension member extending from a first lateral side of the cover and a female lateral extension member extending from a second lateral side of the cover.

BRIEF DESCRIPTION OF THE SEVERAL VIEWS OF THE DRAWINGS

The foregoing summary, as well as the following detailed description of several aspects of the invention, will be better understood when read in conjunction with the appended drawings. For the purpose of illustrating the invention, there are shown in the drawings several preferred embodiments, but it should be understood that the invention is not limited to the precise arrangements and instrumentalities shown.

In the drawings:

FIG. 4 is a rear perspective view of the vehicle wheel well covering of FIG. 1 in a partially folded state;

FIG. 4A is a front perspective view of the vehicle wheel well covering of FIG. 4;

FIG. 5 is a front perspective view of the vehicle wheel well covering of FIG. 1 in a closed configuration;

FIG. 8 is a front elevation view of a first aspect of an extension cover member of the vehicle wheel well covering of FIG. 1;

FIG. 8A is a front perspective view of the extension cover member of FIG. 8;

FIG. 9 is a front perspective view of a second aspect of an extension cover member of the vehicle wheel well covering of FIG. 1;

FIG. 10 is a perspective view of a third aspect of an extension cover member of the vehicle wheel well covering of FIG. 1;

DETAILED DESCRIPTION OF THE INVENTION

Figure 1:
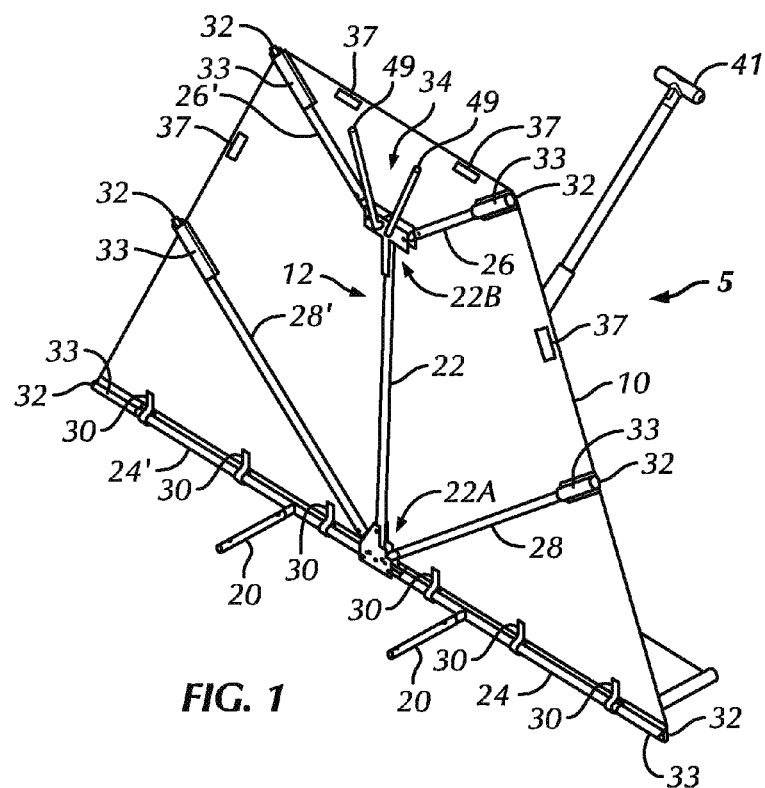
FIG. 1 is a rear perspective view of a vehicle wheel well covering in accordance with a first preferred embodiment of the present invention.

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words noted above, derivatives thereof and words of similar import.

In accordance with a first preferred embodiment, the present invention provides a vehicle wheel well covering 5 as configured in FIGS. 1-7B. The vehicle wheel well covering 5 includes a cover 10, a spine assembly 12, a shovel assembly 14, and a retention prong 20.

The cover 10 is supported by the spine assembly 12, as further discussed below. The cover 10 is configured as a substantially planar sheet having an overall shape and size to cover an expanse of the wheel well area (not shown). The cover 10 is preferably isosceles trapezoid in shape, but can alternatively be configured in other suitable shapes e.g., square, round, oval, octagon and the like. In each configuration, the cover 10 substantially covers the wheel well area of the vehicle and preferably the entire wheel well area. This allows the cover 10 to surround, completely or substantially, any wheel well area of vehicles varying in size and shape.

The cover 10 can be formed from any suitable material, such as metals, polymers, wood, textiles, and composites. Preferably, the cover is formed out of a waterproof material. Exemplary materials suitable for the cover include natural or synthetic fabrics, rigid plastic sheets, or sheet metals. Preferably, the cover is a waterproof synthetic fiber that can be easily folded.

Figure 1A:
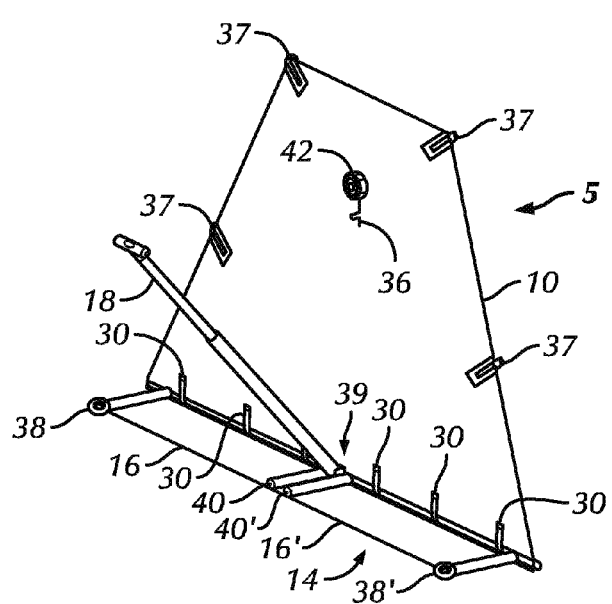
FIG. 1A is a front perspective view of the vehicle wheel well covering of FIG. 1.

The cover 10 optionally includes a fastener 36 for releasably securing a handle 18 to the cover when in use. As shown in FIG. 1A, the fastener 36 is configured as a clip affixed to the upper portion of the cover 10 for clipping onto the handle. The fastener 36 can alternatively be any other suitable attachment member such as a hook and loop fastener, a strap, a hook, and the like.

The cover 10 can also include magnets 37 positioned along the perimeter of the cover's rear side to facilitate attachment to the body of the vehicle. The magnets 37 can be sewn inside a pocket of the cover, adhesively attached, or otherwise connected to the cover. Alternatively, the magnets 37 can be positioned on the spine assembly 12 (see FIG. 1A).

The spine assembly 12 provides stability and supports the cover 10. As best shown in FIG. 1, the spine assembly 12 includes a central support member 22 having a first end 22A and a second end 22B opposite the first end. The spine assembly 12 further includes a first 24, a second 26, a third 28, a fourth 24', a fifth 26', and a sixth 28' extension member. About the first and second ends of the central support member are attached pivot mechanisms for pivotably attaching extension members thereto, as further discussed below.

The central support member 22 and respective extension members are all similarly configured as elongated tubes or rods that extend along the rear face of the cover in the open position. The central support member and extension members can be formed out of any lightweight material such as a metal e.g., aluminum, copper, platinum, steel, and the like, or a polymer e.g., an elastomer, rubber, plastic, and the like. Preferably, the central support member and extension members are formed of aluminum.

The first extension member 24 and fourth extension member 24' are pivotally connected to the first end 22A of the central support member located at a bottom end of the spine assembly 12. The first 24 and fourth 24' extension members are attached to the cover 10 with a plurality of fasteners 30. The fasteners 30 are preferably configured as clips or a strap having hook and loop fasteners or other attachment members for securing the ends of the strap. The first 24 and fourth 24' extension members extend outwardly and perpendicularly from the lateral sides of the central support member 22A so as to run along the bottom edge of the cover 10 and rest on the ground surface when in a use position.

Figure 7:
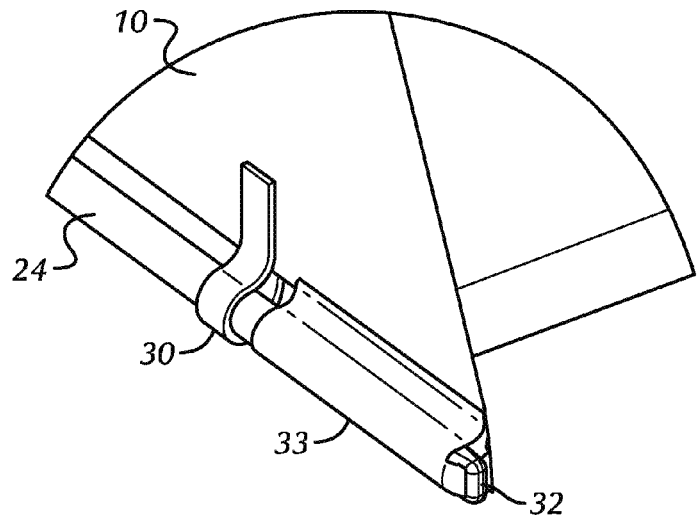
FIG. 7 is an enlarged partial perspective view of the extension member of FIG. 6 attached to a cover of the vehicle wheel well covering of FIG. 1.
Figure 6A:
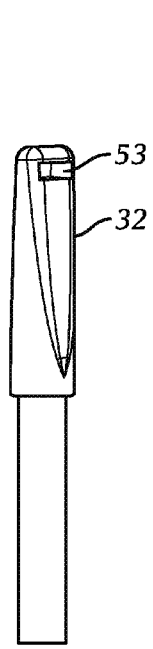
FIG. 6A is an enlarged partial view of a distal end of the extension member of FIG. 6.
Figure 6B:
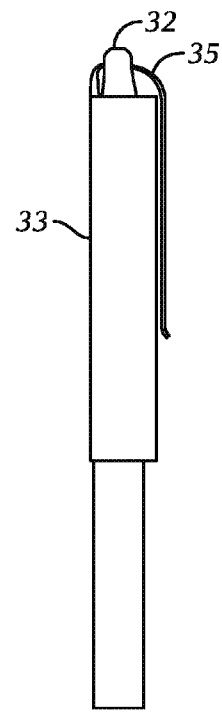
FIG. 6B is an enlarged partial view of a distal end of the extension member of FIG. 6A assembled to the slotted pocket of FIG. 6C.
Figure 6C:
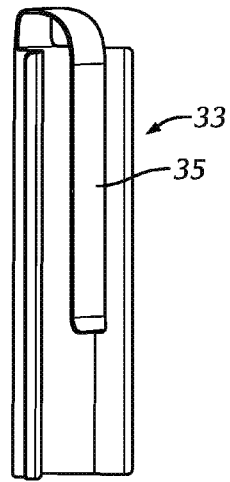
FIG. 6C is a perspective view of a slotted pocket of the cover of FIG. 1.

Referring to FIGS. 6, 6A, 6B, 6C and 7, the first 24 and fourth 24' extension members are additionally secured to the cover with extension member clips 32 located at each distal end of the respective first 24 and fourth 24' extension members. The extension member clips 32 are configured as an end cap having an aperture 53 for receiving a tab 35 extending from a slotted pocket 33 connected to the cover 10. As shown in FIGS. 6B, 6C and 7, the slotted pocket 33 is configured as a pocket attached to the cover forming a slot for receiving respective first 24 and fourth 24' extension members. The tab 35 of the slotted pocket 33 feeds through the aperture 53 of the extension member clip 32 for securing thereto. In sum, each extension member clip 32 is attached to the cover 10, as shown in FIG. 7, with its tab 35 attached to a respective extension member. Each extension member clip 32 can optionally be formed out of a magnetic material e.g., a magnetic, to magnetically secure to the body of the vehicle.

Figure 7A:
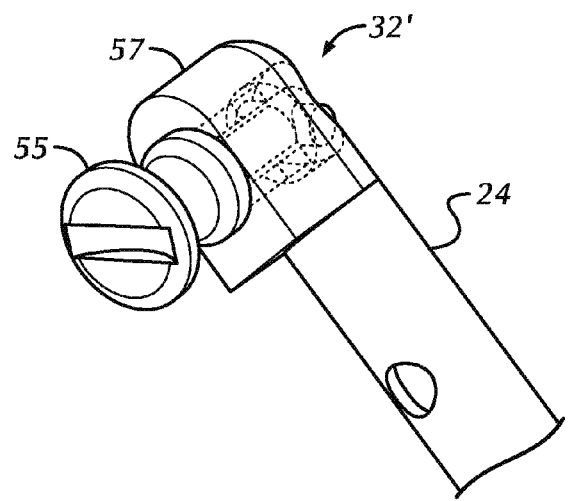
FIG. 7A is an enlarged partial perspective view of another aspect of the extension member of FIG. 6 for attaching to a cover of the vehicle wheel well covering of FIG. 1.

Alternatively, as shown in FIG. 7A, instead of extension member clips 32, each extension member can be configured to have an attachment mechanism 32' in the form of a screw mechanism for securing the cover between a knob 55 and a base member 57. The knob 55 includes a threaded screw portion for engaging a threaded slot on the base member for securing thereto. Thus, the threaded screw portion of the knob 55 is inserted through an aperture in the cover 10 (not shown) and into the threaded slot of the base member 57. As the knob 55 is tightened, the cover is secured between the knob 55 and the base member 57. As such, the cover is secured to the extension member via extension member clips 32'. Additionally, the head on the knob 55 can be utilized as an attachment point for other potential accessories.

Referring back to FIG. 1, the third extension member 28 and the sixth extension member 28' are also pivotably connected to the first end 22A of the central support member located at the bottom end of the spine assembly 12. The third 28 and sixth 28' extension members are each fastened to the cover 10 via a respective extension member clip 32. The third 28 and sixth 28' extension members extend outwardly from the lateral sides of the central support member 22A to an outer edge of about a mid-section of the cover 10. The third 28 and sixth 28' extension members are preferably configured to be positioned at about a 40-60 degree angle from their adjacent first 24 or fourth 24' extension member. The third 28 and sixth 28' extension members provide further stability, shape and support for the middle sections of the cover 10 as they are connected to the cover 10 by respective extension member clips 32.

The second extension member 26 and the fifth extension member 26' are pivotably connected to the second end 22B of the central support member located at an upper end of the spine assembly 12. The second 26 and fifth 26' extension members are each fastened to the cover 10 with respective extension member clips 32.

The second 26 and fifth 26' extension members extend outwardly from the lateral sides of the central support member 22B to an outer edge of an upper section of cover 10. As shown in FIG. 1, the second 26 and fifth 26' extension members are preferably configured to be positioned at about a 120-150 degree angle relative to the central support member 22. The second 26 and fifth 26' extension members provide further stability, shape, and support for the upper area of the cover 10 as they are connected to the cover 10 by respective extension member clips 32.

Referring to FIG. 1A, the shovel assembly 14 is coupled to the spine assembly to form a repository for collecting snow falling around the wheel well area of the vehicle. The shovel assembly 14 includes a pair of shoveling members 16, 16' and a handle 18 coupled to the spine assembly.

Each shoveling member 16, 16' is respectively coupled to the first 24 and fourth 24' extension members located at the bottom portion of the spine assembly 12 so as to pivot with the respective extension members.

Each shoveling member 16, 16' is configured as a substantially planar member having a generally rectangular shape. The overall width of shoveling members 16, 16' collectively span substantially the entire width of the cover. The shoveling members 16, 16' are preferably rectangular in shape, but alternatively can be configured in other suitable shapes e.g., square, round, oval, octagon, and the like suitable for use as a shoveling blade. The shoveling members 16, 16' include cylindrical ends for sliding onto end attachments 38, 40 and 38', 40', as further discussed below.

The shoveling members 16, 16' can be formed out of any lightweight material such as a metal e.g., aluminum, copper, platinum, silver and the like, or a polymer e.g., a rigid plastic and the like. Preferably, the shoveling member is formed of aluminum.

Figure 3:
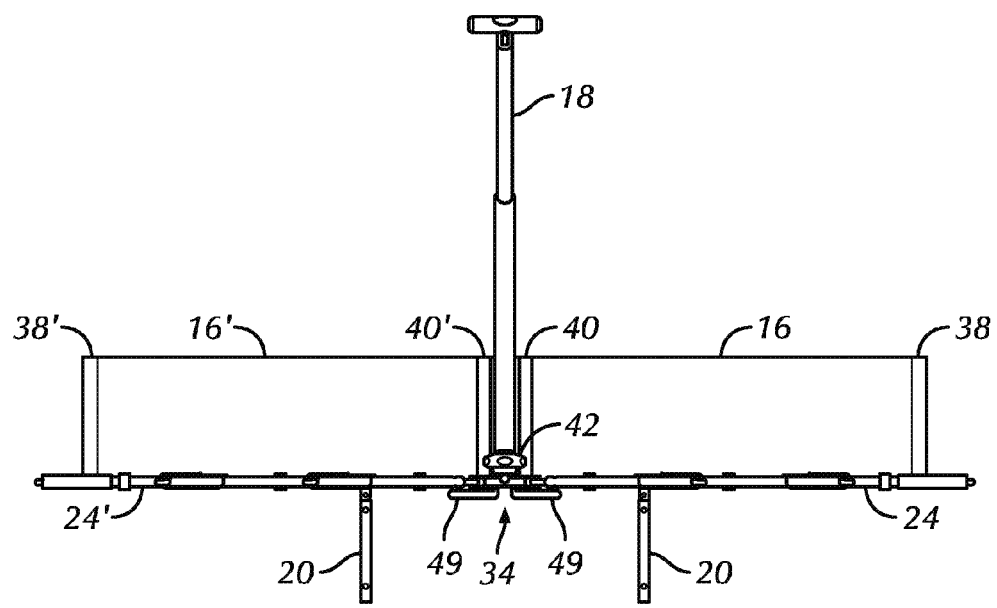
FIG. 3 is a top plan view of the vehicle wheel well covering of FIG. 1.
Figure 6:
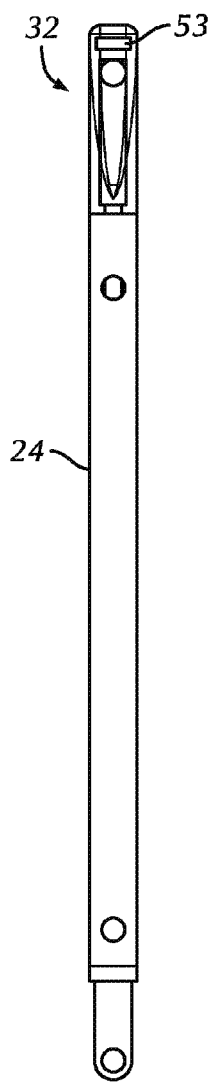
FIG. 6 is an enlarged view of an extension member of a spine assembly of the vehicle wheel well covering of FIG. 1.

As shown in FIGS. 1A and 3, the shoveling members 16, 16' are coupled to respective first 24 and fourth 24' extension members of the spine assembly 12 via end attachments 38, 40 and 38', 40'. The end attachments are configured as elongated tubes or rods that extend outwardly from and preferably perpendicularly from the extension member. Then, the cylindrical ends of the shoveling members are slid onto the respective end attachments.

The end attachments can be formed out of any lightweight material such as a metal e.g., aluminum, copper, platinum, silver and the like, or a polymer e.g., a rigid plastic and the like. Preferably, the end attachments are formed of aluminum.

The proximal end of each respective end attachment is directly attached to respective first 24 and fourth 24' extension members that run along the bottom portion of the spine assembly 12. The first 24 and fourth 24' extension members can be attached to the end attachments by welding, fasteners, or be of unitary construction with the end attachments. The end attachments can optionally include a pair of retractable wheels or gliders 225, as shown on the embodiment illustrated in FIG. 16, to facilitate movement of the shoveling members 16, 16'. The wheels and/or gliders can be formed of rigid plastic or rubber can be used to facilitate movement of the shoveling members 16, 16'.

Figure 2:
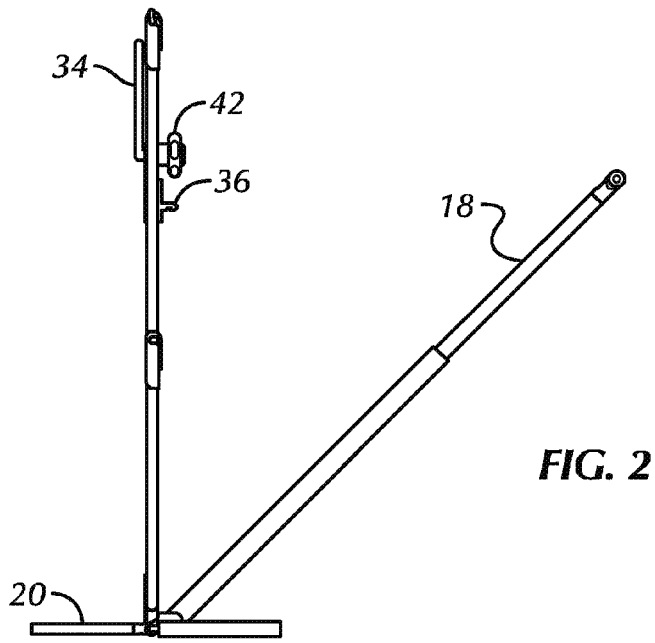
FIG. 2 is a lateral elevation view of the vehicle wheel well covering of FIG. 1.

Referring now to FIGS. 1-3, the handle 18 is pivotably coupled to the shovel assembly 14 between shoveling members 16 and 16'. The handle 18 can be moved from an extended position (as seen in FIG. 1A) to a stowed/use position (as seen in FIG. 4A). Specifically, the handle 18 is pivotably coupled so as to pivot about an axis substantially parallel to a longitudinal axis of the first 24 and fourth 24' extension members. The handle can be used for shoveling snow when untethered from the fastener 36 or when fastened to the cover by fastener 36. In an aspect of the present embodiment, the handle 18 can be attached between the shoveling members 16, 16' with a spring loaded hinge 39.

The handle 18 is preferably configured as a telescopic tube or rod with a proximal end coupled to the shovel assembly 14 and a distal end having a handle 41. The handle 18 can be formed out of any lightweight material such as a metal e.g., aluminum, copper, platinum, silver and the like, or a polymer e.g., a rigid plastic and the like. The handle 41 is preferably configured as a T-shaped member, but can alternatively be configured as any other suitable handle.

As mentioned above, the spring loaded hinge 39 is mounted about a midpoint of the shovel assembly 14 and abuts a central lower portion of the cover 10. The spring loaded hinge is pivotably connected to a proximal end of the handle 18 and facilitates movement of the handle into multiple positions. In an aspect, the spring loaded hinge 39 biases the handle 18 to an upright position abutting the cover 10. As best shown in FIG. 1A, the front face of the cover 10 additionally includes a fastener 36 about a middle portion of the cover for releasably securing an upper portion of the handle to the cover 10.

The vehicle wheel well covering further includes a retention prong 20 extending rearwardly from the spine assembly 12. As best shown in FIG. 1, the retention prong 20 is preferably configured as tubes or rods that extend out from a bottom portion of the spine assembly rearwardly of the cover. The retention prong 20 is configured to abut a wheel of a vehicle and provide further stability and support to secure the vehicle wheel well covering to the vehicle. Preferably, the vehicle wheel well covering includes a pair of spaced apart prongs for abutting opposite ends of a vehicle's wheel. The retention prong can be formed out of any lightweight material such as metal e.g., aluminum, copper, platinum, silver, and the like, or a polymer e.g., an elastomer, rubber, plastic, and the like.

The proximal end of the respective retention prongs 20 can be directly attached to the first 24 and fourth 24' extension members that run along the bottom portion of the spine assembly 12 or be of unitary construction with the extension member.

Referring back to FIG. 1, there is shown a locking member 34 extending from the central support member 22 for securing the vehicle wheel well covering to a vehicle. The locking member 34 includes a pair of locking prongs 49 that rotate between an unlocked position (FIG. 4) and a locked position (FIG. 1). In the unlocked position, the prongs 49 of the locking member 34 are directed downwardly. To then move the locking member to the locked position, the prongs are rotated so as to point upwardly so as to engage the underside of the body of the car in the vehicle wheel well area (not shown). Once in the locked position, the prongs prevent the vehicle wheel well covering from being removed by abutting against the body of the vehicle wheel well.

A key lock 42 (FIG. 4A) is used to secure the prongs in the locked position. Alternatively, the rotation of the locking member can be directly coupled to a key lock housing 43 (FIG. 7B) of the key lock. In yet another aspect, the rotation of the locking prongs may be controlled by a rotatable knob associated with the key lock 42. In a further aspect, the locking member can be configured to be manually fit into position by a user and then locked in position by the key lock.

Figure 7B:
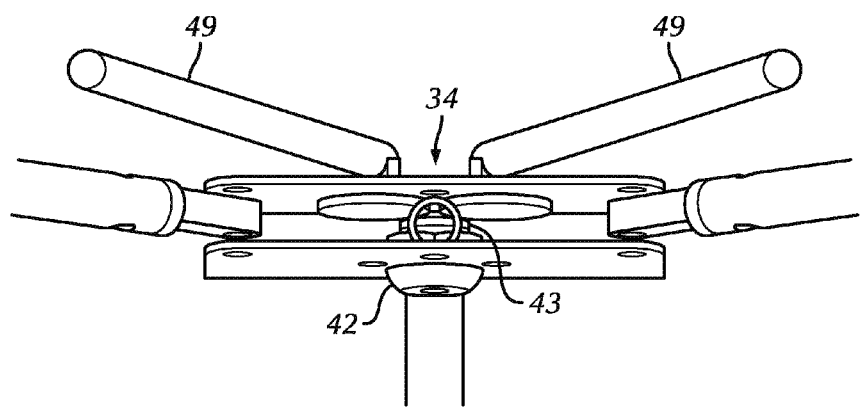
FIG. 7B is an enlarged partial perspective view of a locking member of the vehicle wheel well covering of FIG. 1.

Referring to FIG. 7B, the key lock 42 is configured to be rotatably connected to the locking member 34 through an aperture in the cover. That is, the key lock 42 rotates the locking prongs 49 so as to move the locking prongs between a locked and unlocked position. In the locked position, the key lock 42 prevents further rotation of the locking prongs 49. In sum, the locking member 34 and the retention prongs 20 assist in securing the vehicle wheel well covering to a vehicle.

Referring to FIGS. 8-12A, the vehicle wheel well covering optionally includes an extension cover member adjustably coupled to the cover or spine assembly 12. The extension cover member is designed to connect a plurality of vehicle wheel well coverings and can extend around a front or rear of the vehicle between respective wheel well coverings. The extension cover member is configured to prevent snow, ice and other debris from collecting in the undercarriage area of a vehicle and protect these areas from shovel scrapes and dents.

In accordance with a first aspect of the extension cover member 56A shown in FIGS. 8 and 8A, the extension cover member 56A is configured as a plurality of connectable vertical panels 44. The vertical panels 44 extend upward from the ground to a point below the bottom door height of a vehicle (not shown). A horizontal panel 46 runs along the ground to pivotably support an individual panel. Each set of interconnected vertical and horizontal panels are connected by a fabric member 51 allowing for flexibility between adjacent panels. The extension cover member 56A is coupled to the spine assembly 12 of the vehicle wheel well covering via fasteners.

FIG. 9 illustrates a second aspect of an extension cover member 56B applicable to the present embodiment. The extension cover member 56B is configured as an elongated cover member having a substantially L-shaped longitudinal cross section. The extension cover member includes attachment tabs 48 for securing the extension cover member to the vehicle by engaging between the door and the vehicle chassis about a top edge of the extension cover member. Additionally, the extension cover member includes lateral attachments 50 to secure the lateral portions of the extension cover member to the vehicle wheel wells 1000. Reinforcing members 52 can be attached to the extension cover member to provide support. For example, the extension cover member can be formed from a textile while the reinforcing member formed from rigid plastic to give support and shape to the textile extension cover member.

FIG. 10 illustrates a third aspect of an extension cover member 56C applicable to the present embodiment. The extension cover member 56C is configured as an elongated cover member having a substantially L-shaped longitudinal cross section. The extension cover member includes lateral attachments 50 to secure the lateral portions of the extension cover member to the vehicle wheel wells (not shown). Additionally, the extension cover member includes reinforcing members 52.

Figure 11:
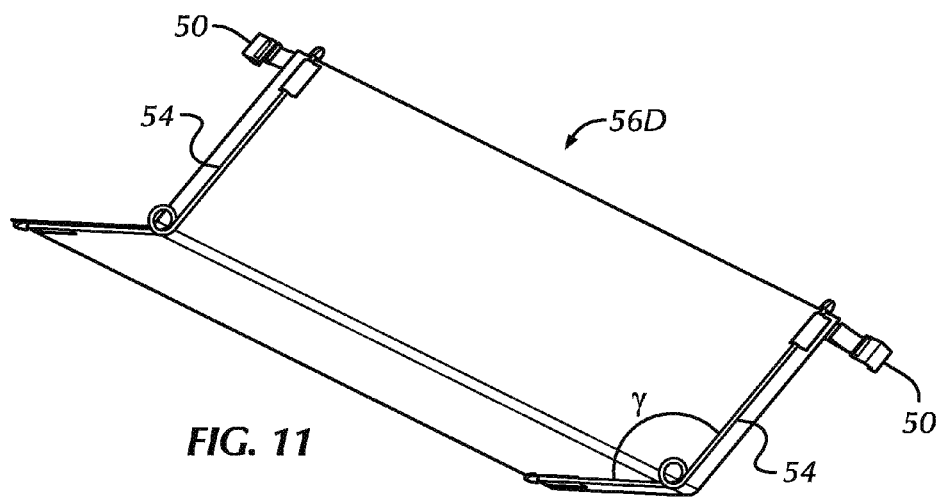
FIG. 11 is a front perspective view of a fourth aspect of an extension cover member of the vehicle wheel well covering of FIG. 1.

FIG. 11 illustrates a fourth aspect of an extension cover member 56D applicable to the present embodiment. The extension cover member 56D is configured as two planar members, an upper planar member and a lower planar member, configured with a pair of support rod springs 54 located at lateral ends of the planar members. The support rod springs 54 bias the planar members outwardly such that the upper planar member can be placed underneath a bottom end of a vehicle. As the lower planar member is pushed towards the vehicle and a ground surface, a positive tension develops in the support rod springs 54, securing the extension cover member in position. The support rod springs 54 adjust the height of the extension cover member relative to a bottom end of a vehicle (not shown). An obtuse angle γ is formed between the upper planar member and lower planar member. For example, the angle γ will increase as the height of a bottom end of the vehicle decreases. Alternatively, as the height of the bottom end of the vehicle increases, the angle γ decreases. Additionally, the ends of the extension cover member can be secured to an inner portion of a vehicle wheel well area with respective lateral attachments 50.

Figure 12:
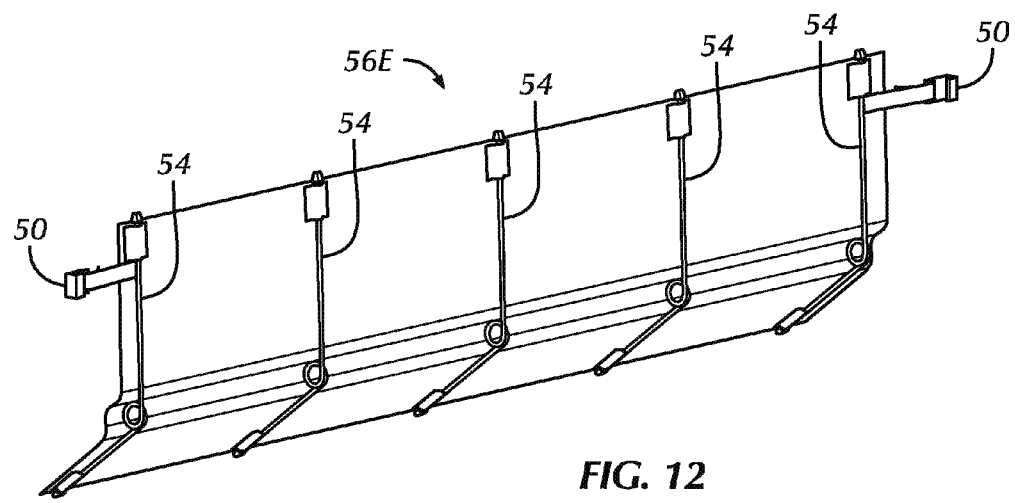
FIG. 12 is a rear perspective view of a fifth aspect of an extension cover member of the vehicle wheel well covering of FIG. 1.

FIG. 12 illustrates a fifth aspect of an extension cover member 56E applicable to the present embodiment. The extension cover member 56E is similarly configured to the extension cover member of FIG. 11 but contains a plurality of spaced apart support rod springs 54 along the length of the extension cover member. The ends of the extension cover member are secured to an inner portion of a vehicle wheel well area with respective lateral attachments 50.

Figure 12A:
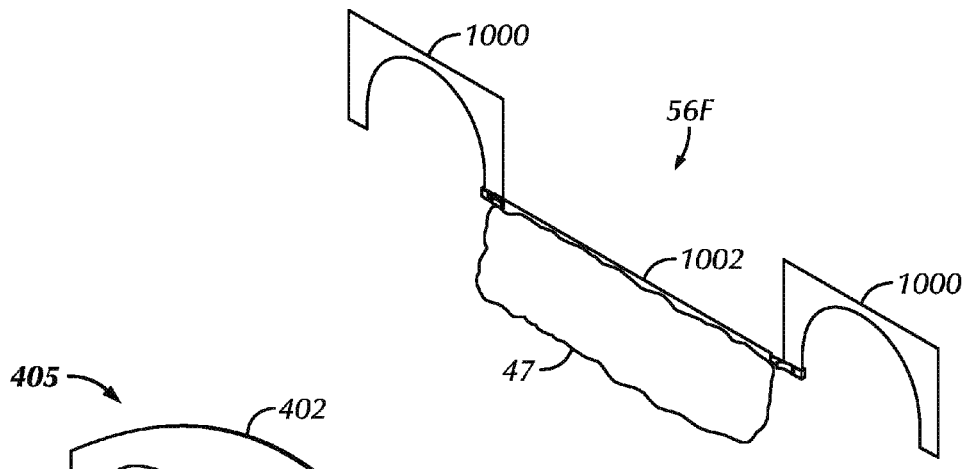
FIG. 12A is a front perspective view of a sixth aspect of an extension cover member of the vehicle wheel well covering of FIG. 1.
Figure 19A:
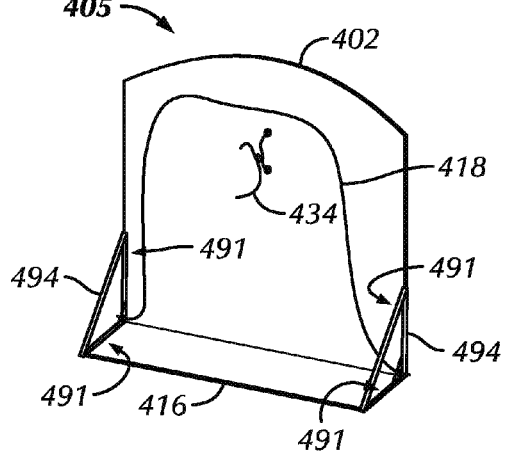
FIG. 19A is a front perspective view of a vehicle wheel well covering in accordance with a fifth preferred embodiment of the present invention.
Figure 19B:
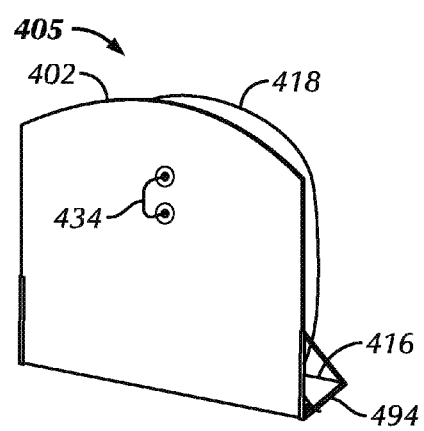
FIG. 19B is a rear perspective view of the vehicle wheel well covering of FIG. 19A.
Figure 19C:
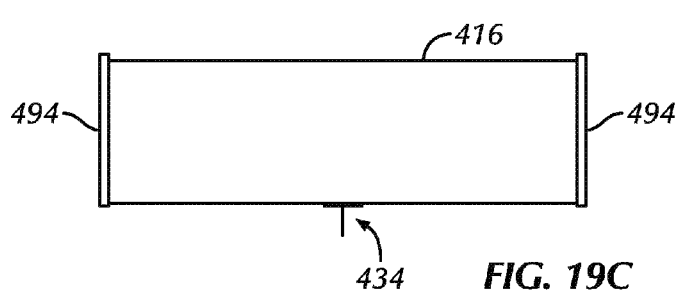
FIG. 19C is a bottom plan view of the vehicle wheel well covering of FIG. 19A.
Figure 19D:
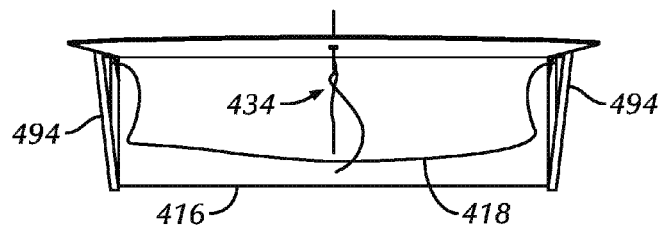
FIG. 19D is a top plan view of the vehicle wheel well covering of FIG. 19A.
Figure 19E:
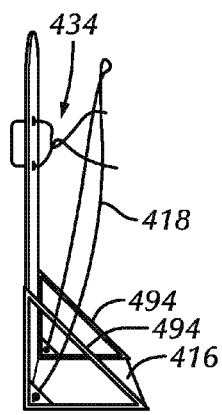
FIG. 19E is a side perspective view of the vehicle wheel well covering of FIG. 19A.

FIG. 12A illustrates a sixth aspect of an extension cover member 56F applicable to the present embodiment. The extension cover member 56F is configured as an elongated inflatable balloon member 47 spanning a length between the respective vehicle wheel wells 1000. When inflated, the balloon member 47 expands to abut a bottom end of a vehicle 1002 and the ground surface. Additionally, the balloon member 47 optionally has attachments (not shown) to secure the balloon member to the vehicle.

In sum, the vehicle wheel well covering of the present embodiment includes a cover 10 and a shoveling blade 16 extending from the cover. The cover 10 is configured to have a size and shape sufficient to cover the expanse of a wheel well area. The cover can be sized and shaped sufficiently to cover variations in size of vehicle wheel wells of various vehicle makes and models. The cover 10 is sized and shaped sufficiently to substantially cover the entirety of the vehicle wheel well.

The shoveling blade 16 is preferably configured as a planar member composed of a strong lightweight material such as plastic or aluminum and lies parallel to or adjacent the ground. The shoveling blade 16 coupled with the cover 10 forms a repository for accumulating debris such as snow falling in front of the wheel well area of the vehicle. The shoveling blade 16 attaches to the cover 10 about a bottom end of the cover and supports partially or totally the cover such that the cover extends upwardly from the shoveling blade. Preferably the shoveling blade 16 extends across an entire width of the cover 10.

Figure 13:
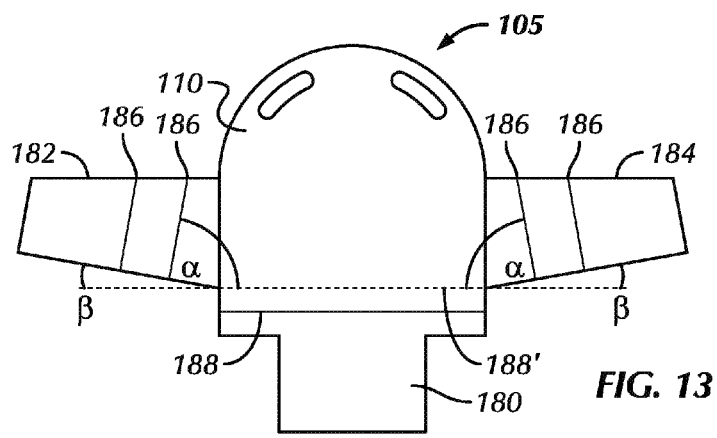
FIG. 13 is a front view of a foldable vehicle wheel well covering in accordance with a second preferred embodiment of the present invention in a fully unfolded state.
Figure 14:
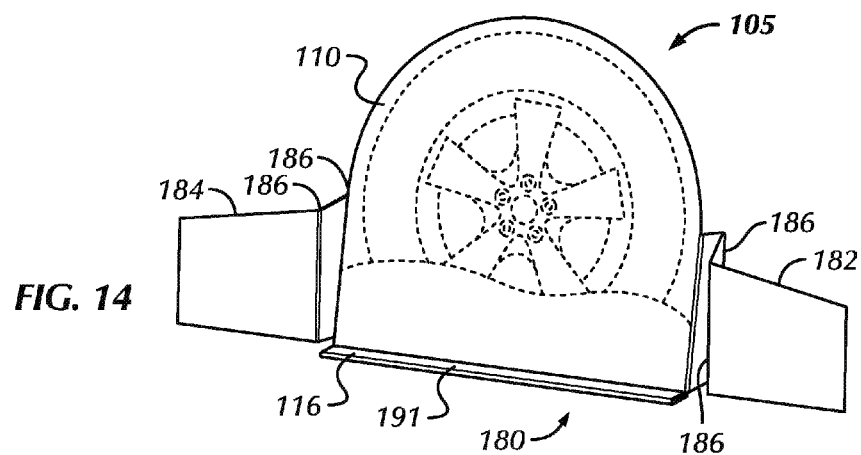
FIG. 14 is a perspective view of the foldable vehicle wheel well covering of FIG. 13 in a fully folded state.
Figure 15:
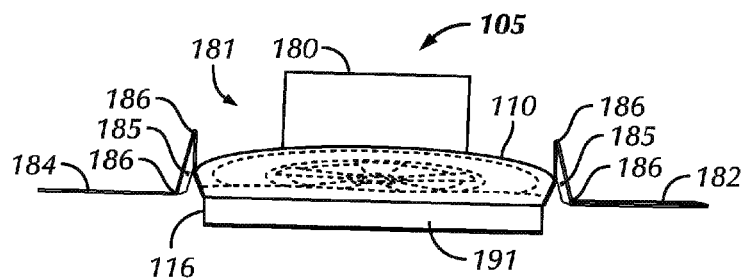
FIG. 15 is a top plan view of the foldable vehicle wheel well covering of FIG. 14.

In accordance with a second preferred embodiment, the present invention provides a foldable vehicle wheel well covering 105 as configured in FIGS. 13-15. The foldable vehicle wheel well covering includes a cover panel 110, a base panel 180, a first lateral panel 182 and a second lateral panel 184. The vehicle wheel well covering 105 in an unfolded state is shown in FIG. 13, and is configured as a substantially planar sheet with foldable portions. The foldable vehicle wheel well covering 105 can be formed from any material suitable for folding, such as corrugated plastic or cardboard, sheet metals, or rigid plastic sheets.

The cover panel 110 is supported by the base panel 180 when folded, as further discussed below. The cover panel 110 is configured as a planar portion having an overall shape and size to cover an expanse of the wheel well area (not shown). The cover panel preferably has a rounded upper portion corresponding to the rounded portion of a vehicle wheel well area and a rectangular bottom portion, but can alternatively be configured in other suitable shapes e.g., square, oval, triangle and the like. In each configuration, the cover panel 110 substantially covers the wheel well area of the vehicle.

The base panel 180 extends from the cover panel 110 and foldably connects to a bottom end of the cover panel about folding line 188 about a first direction for forming a supporting base 181 (FIG. 15) and supporting the cover panel. The base panel 180 is configured as a planar flap foldably connected along a bottom edge of the cover panel 110. The base panel is preferably rectangular in shape, but can alternatively be configured in other suitable shapes, e.g. square, round, oval, octagon and the like. The base panel 180 includes a bottom tab having a width less than an overall width of the cover panel 110. In a preferred embodiment, the bottom tab portion has lateral sides measuring about 7 to 17 inches and a width measuring about 12 to 24 inches. In each configuration, the base panel 180 is configured to rest on a ground surface and provide support for the raised cover panel 110. Additionally, a wheel of the vehicle can be driven onto the base panel 180 to further secure the foldable vehicle wheel well covering 105 to the vehicle.

The first lateral panel 182 and the second lateral panel 184 each foldably connect to the cover panel 110 about the first and second lateral sides of the cover panel. The first and second lateral panels 182, 184 are configured as planar flaps extending from the lateral sides. The lateral panels each have a width measuring about 18 to 32 inches and a height measuring about 7 to 19 inches in the unfolded state.

The first and second lateral panels 182, 184 are each foldable about a pair of spaced apart parallel folding lines 186 angled relative to a vertical lateral side of the cover panel 110. Preferably, the folding lines have an angle α relative to a vertical lateral side of the cover panel of about 65-85 degrees and preferably about 75 degrees. These folding lines allow for forming bent first and second lateral panels. As best shown in FIGS. 14 and 15, the first and second lateral panels 182, 184 are folded along folding lines 186. When bent, the panels form a triangular shape to provide support for the raised cover panel 110. The bottom edge of the first and second lateral panels 182, 184 extending outward from the lateral sides of the cover panel 110 form an acute angle β of 10-20 degrees relative to the bottom edge of the cover panel 110.

Additionally, the first and second lateral panels 182, 184 further include a fastener 185 for releasably holding the first and second lateral panels in their respective folded positions. As best shown in FIG. 15, the fasteners 185 can be placed between folded portions of the respective first and second lateral panels. The fasteners 185 are preferably clips, an adhesive, or a strap having hook and loop fasteners or other attachments for securing each end.

The base panel 180 further includes an additional folding line 188' between folding line 188 and the cover panel 110 to fold the base panel in a second direction substantially opposite the first direction for forming a folded flap 191 about a bottom end of the cover panel. As best shown in FIGS. 14 and 15, the folded flap 191 forms a shoveling member. The shoveling member spans a width measuring about 28 to 33 inches and has a depth of about 2 to 6 inches. Preferably, the shoveling member spans the entire width of the cover panel. The shoveling member 116 and the cover panel 110 form a repository for collecting snow and other debris.

Figure 16:
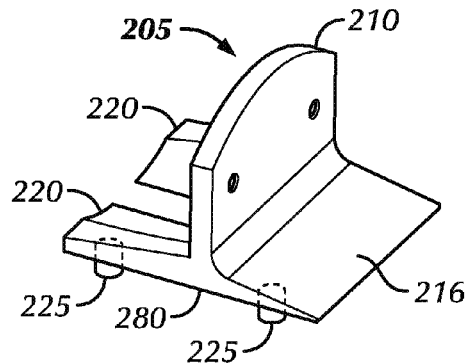
FIG. 16 is a perspective view of a vehicle wheel well covering in accordance with a third preferred embodiment of the present invention.

In accordance with a third preferred embodiment, the present invention provides a vehicle wheel well covering 205 as shown in FIG. 16. The vehicle wheel well covering includes a base 280 and a cover member 210. The base and its components can be formed from any suitable material, such as metals, polymers, wood, and composites.

The base is configured as a planar member that supports the cover member 210. The base 280 is substantially perpendicular to the raised cover member 210 and has an anterior side and a posterior side. An anterior portion of the base forms a shovel member 216 that extends outwardly from the cover member 210. The shovel member is configured as a tapered member, as shown in FIG. 16.

The base further includes a retention member 220 for abutting a wheel of a vehicle. The retention member 220 extends outwardly from a posterior side of the cover member 210. The retention member 220 is configured to provide stability and support to secure the vehicle wheel well covering to the vehicle. Preferably, the vehicle wheel well covering includes a pair of spared apart retention members 220 for abutting opposite ends of a vehicle's wheel. The base further includes a pair of retractable wheels or gliders 225 to facilitate movement of the vehicle wheel well covering. The wheels or gliders can be formed of rigid plastic or rubber to facilitate movement of the vehicle wheel well covering.

Figure 17:
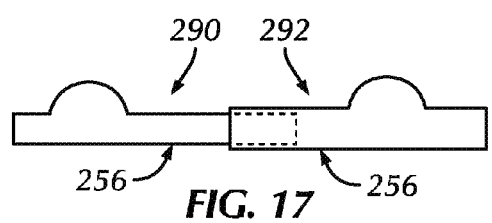
FIG. 17 is a schematic front view of a pair of vehicle wheel well coverings in accordance with an aspect of the third preferred embodiment.

Referring to FIG. 17, the vehicle wheel well covering optionally includes extension cover members 256 connectable to the vehicle wheel well covering 205. A male lateral extension member 290 extends from a first lateral side of the cover and a female lateral extension member 292 extends from a second lateral side of the cover. The male lateral extension member 290 is designed to slidably engage the female lateral extension member 292 of another vehicle wheel well covering such that an overall width of the extension cover member can be adjusted.

Figure 18A:
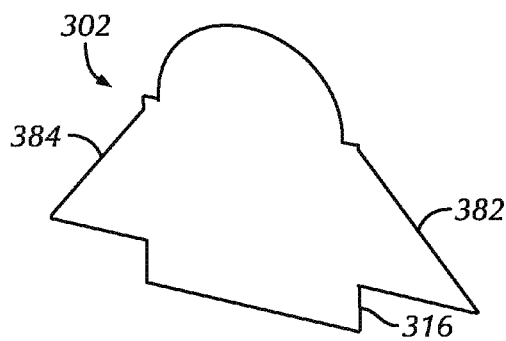
FIG. 18A is a front perspective view of a cover of a vehicle wheel well covering of FIG. 18.
Figure 18:
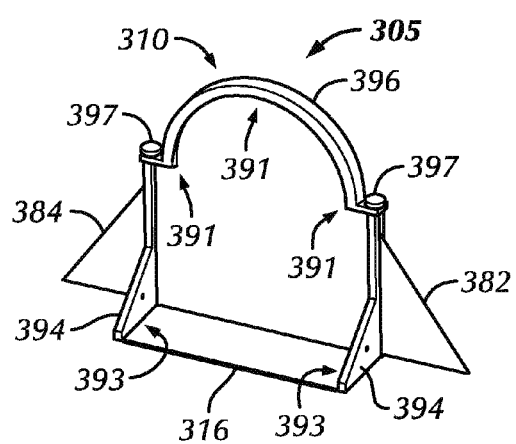
FIG. 18 is a front perspective view of a vehicle wheel well covering in accordance with a fourth preferred embodiment of the present invention.
Figure 18B:
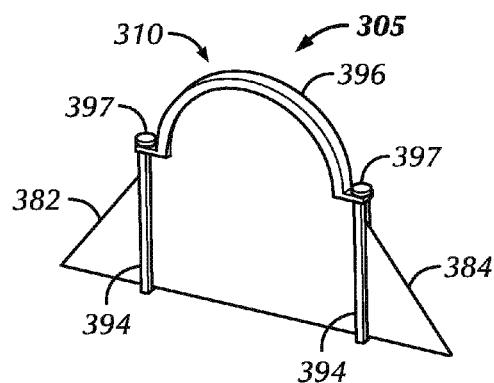
FIG. 18B is a rear perspective view of the vehicle wheel well covering of FIG. 18.
Figure 18C:
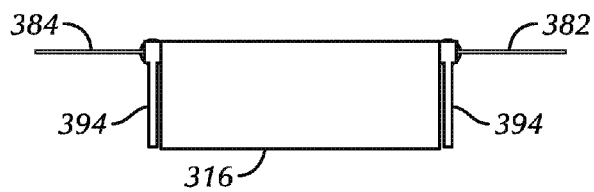
FIG. 18C is a bottom plan view of the vehicle wheel well covering of FIG. 18.
Figure 18D:
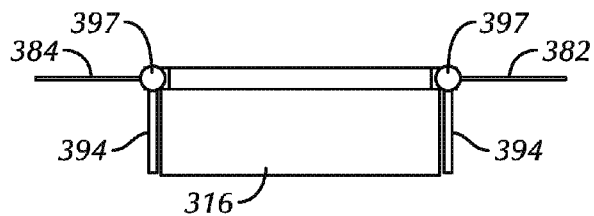
FIG. 18D is a top plan view of the vehicle wheel well covering of FIG. 18.
Figure 18E:
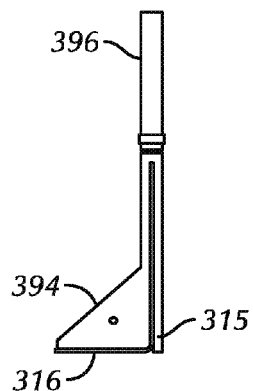
FIG. 18E is a lateral elevation view of the vehicle wheel well covering of FIG. 18.

In accordance with a fourth preferred embodiment, the present invention provides a foldable vehicle wheel well covering 305 as shown in FIGS. 18-18E. The foldable vehicle wheel well covering includes a disposable insert 302 and a frame 310. The disposable insert 302 in an unfolded state is shown in FIG. 18A, and is configured as a substantially planar sheet with a foldable bottom portion 316 for securing the disposable insert 302 to the frame. The disposable insert 302 can be formed from any material suitable for folding, such as corrugated plastic or cardboard, sheet metals, or rigid plastic sheets.

The frame 310 is configured as shown in FIGS. 18, 18B, and 18E and includes a slot 315 for receiving the disposable insert from a bottom end of the frame. The frame includes a rounded upper portion corresponding to the rounded portion of a vehicle wheel well area and side support members 394. As shown in FIGS. 18 and 18E, the side support members 394 are configured as triangle shaped panels providing support for the foldable vehicle wheel well covering and form the sides of a shovel member formed by bottom portion 316. The side support members 394 further include grooves for receiving the bottom portion of the disposable insert 302 and slots for receiving a pair of lateral panels 382, 384 of the disposable insert 302.

The upper portion and lateral sides of the disposable insert 302 (FIG. 18) are configured to engage corresponding grooves 391 located under the central support member 396 and the respective side support members 394. When in place, the bottom portion 316 of the disposable insert 302 is folded to form a shovel member. The lateral sides of the shovel member formed by bottom portion 316 are configured to engage with corresponding grooves 393 at a bottom inner portion of the respective side support members 394.

The vehicle wheel well covering 305 includes a rotating cap 397 about the top ends of the side support members 394 to allow the side support members to rotate inwardly and outwardly. When the lateral panels 382, 384 are inserted in slot 315 of the side support members 394 and engaged with the grooves 391, the rotating cap 397 is locked in position and restricts movement of the side support members. The rotating cap 397 can include a lock for additionally securing the disposable insert to the frame. The shovel member formed by bottom portion 316 and the disposable insert 302 form a repository for collecting snow and other debris. The frame 310 can optionally include a pair of retractable wheels or gliders 225, as shown in the embodiment of FIG. 16, to facilitate movement of the foldable vehicle wheel well covering 305.

In accordance with a fifth preferred embodiment, the present invention provides a foldable vehicle wheel well covering 405 as shown in FIGS. 19A-19E. The foldable vehicle wheel well covering includes a disposable insert 402 and a pair of side support members 494. This disposable insert 402 is configured as a substantially planar sheet with a foldable portion about its bottom edge for forming a shovel member 416. The disposable insert 402 can be formed from any material suitable for folding, such as corrugated plastic or cardboard, sheet metals, or rigid plastic sheets.

The side support members 494 are configured as triangle shaped panels providing support for the disposable insert 402. The side support members 494 further include grooves 491 for securing each lateral side of the disposable insert 402. Preferably, the side support members 494 are made of aluminum or plastic. The side support members 494 additionally include apertures for securing the ends of a rope, wire, chain, and the like to form a handle 418 for the foldable vehicle wheel well covering.

The lateral sides of the disposable insert 402 engage with the respective grooves 491 on the inner portion of the side support members 494. When in place, a bottom portion of the disposable insert 402 is folded to form shovel member 416. The shovel member 416 and the disposable insert 402 form a repository for collecting snow and other debris. The disposable insert 402 additionally includes a locking member 434 for securing the foldable vehicle wheel well covering to a vehicle's wheel. Specifically, the locking member 434 (FIGS. 19A and 19B) is configured as a pair of apertures for securing the foldable vehicle wheel well covering with a rope, wire, chain and the like to a hub of a vehicle's wheel similar to a bicycle lock. The shovel member 416 can optionally include a pair of retractable wheels or gliders 225, as shown in the embodiment of FIG. 16, to facilitate movement of the shovel member 416.

Figure 20:
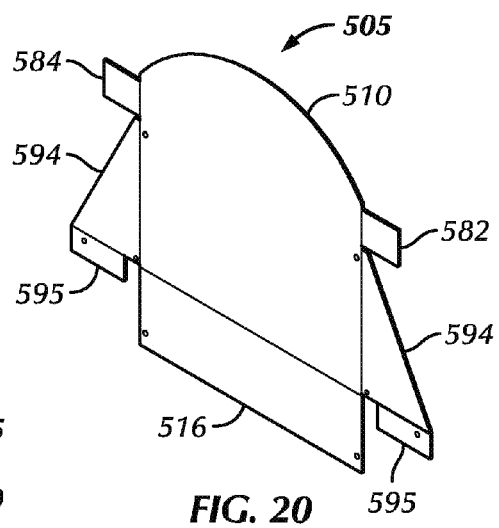
FIG. 20 is a front perspective view of a vehicle wheel well covering in accordance with a sixth preferred embodiment of the present invention in an unfolded state.
Figure 20A:
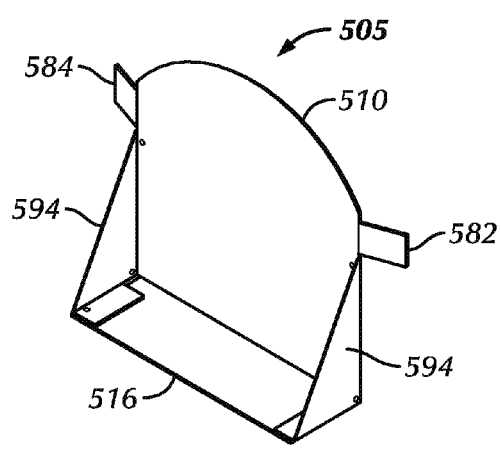
FIG. 20A is a front perspective view of the vehicle wheel well covering of FIG. 20 in a fully folded and assembled state.
Figure 20C:
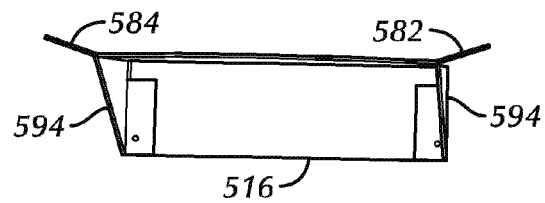
FIG. 20C is a top perspective view of the vehicle wheel well covering of FIG. 20A.
Figure 20B:
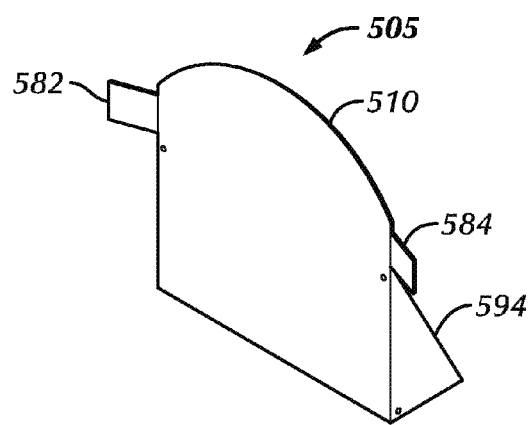
FIG. 20B is a rear perspective view of a cover of the vehicle wheel well covering of FIG. 20A.
Figure 20D:
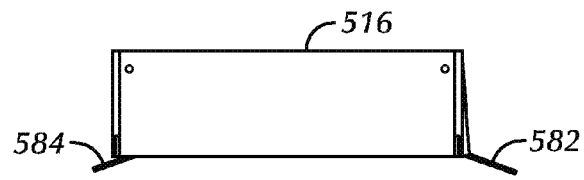
FIG. 20D is a bottom perspective view of the vehicle wheel well covering of FIG. 20A.
Figure 20E:
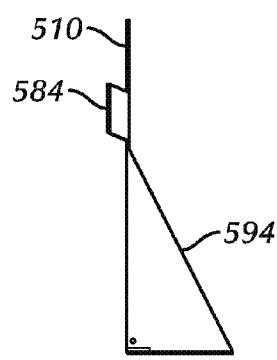
FIG. 20E is a lateral elevation view of the vehicle wheel well covering of FIG. 20A.

In accordance with a sixth preferred embodiment, the present invention provides a foldable vehicle wheel well covering 505 as configured in FIGS. 20-20E. The foldable vehicle wheel well covering includes a cover panel 510, a base panel 516, and a pair of lateral panels 594. The foldable vehicle wheel well covering 505 in an unfolded state is shown in FIG. 20, and is configured as a substantially planar sheet with foldable portions. The foldable vehicle wheel well covering 505 can be formed from any material suitable for folding, such as corrugated plastic or cardboard, sheet metals, or rigid plastic sheets.

The cover panel 510 is supported by the base panel 516 when folded, as further discussed below. The cover panel 510 is configured as a planar portion having an overall shape and size to cover an expanse of the wheel well area (not shown). The cover panel 510 preferably has a rounded upper portion corresponding to the rounded portion of a vehicle wheel well area and a rectangular bottom portion, but can alternatively be configured in other suitable shapes e.g., square, oval, triangle and the like. The cover panel 510 includes tabs 582, 584 extending from the lateral sides of an upper end of the cover panel. The tabs 582, 584 are foldably inserted into the wheel rim of a vehicle (not shown) to provide support for the foldable vehicle wheel well covering.

The base panel 516 extends from the cover panel 510 and foldably connects to a bottom end of the cover panel about a first direction for forming a supporting base and supporting the cover panel 510. The base panel 516 is configured as a planar flap foldably connected along a bottom edge of the cover panel 510. The base panel is preferably rectangular in shape, but can alternatively be configured in other suitable shapes, e.g., square, round, oval, octagon and the like. The base panel 516 is configured to rest on a ground surface and provide support for the raised cover panel 510. The base panel 516 can optionally include a pair of retractable wheels or gliders 225, as shown in the embodiment of FIG. 16, to facilitate movement of the base panel 516.

The lateral panels 594 include tabs 595 for foldably connecting to respective ends of the base panel 516. The lateral panels are configured as planar flaps extending from the lateral sides of the cover panel 510. The lateral panels 594 connect with the base panel 516 forming a base for supporting the foldable vehicle wheel well covering and forming a repository for collecting snow and other debris. Each foldable portion can include fasteners for securing their folded portions in place. The fasteners are preferably clips, an adhesive, or a strap having hook and loop fasteners or other attachments for securing each end.

It will be appreciated by those skilled in the art that changes could be made to the embodiments described above without departing from the broad inventive concept thereof. It is to be understood, therefore, that this invention is not limited to the particular aspects disclosed, but it is intended to cover modifications within the spirit and scope of the present invention as defined by the appended claims.

We claim:

1. A vehicle wheel well covering comprising:
a cover for covering a vehicle wheel well:
a shovel assembly extending from the cover;
a spine assembly supporting the cover; and
a retention prong extending from the spine assembly;
wherein the shovel assembly, is coupled to the spine assembly, the shovel assembly including:
a shoveling member, and
a handle coupled to the shoveling member.

2. The vehicle wheel well covering of claim 1, wherein the spine assembly comprises a central support member having a first extension member pivotably connected to a first end of the central support member, and a second extension member pivotably connected to a second end of the central support member opposite the first end.

3. The vehicle wheel well covering of claim 2, wherein the handle is pivotably connected to the first end of the central support member.

4. The vehicle wheel well covering of claim 2, further comprising a locking member extending from the central support member for securing the vehicle wheel well covering to a vehicle.

5. The vehicle wheel well covering of claim 2, wherein the shoveling member is connected to the first extension member.

6. The vehicle wheel well, covering of claim 2, wherein the second extension member has a first end pivotably connected to the central support member and a second end connected to an outer edge of the cover.

7. The vehicle wheel well covering of claim 2, wherein the first extension member and the second extension member pivot between an open position for expanding the cover and a closed position for collapsing the cover.

8. The vehicle wheel well covering of claim 1, wherein the cover includes a fastener for releasably securing the handle to the cover.

9. The vehicle wheel well covering of claim 1, further comprising an extension cover member releasably connected to the spine assembly.

* * * * *